Jan. 15, 1957　　　　E. ROLF ET AL　　　　2,777,982
ELECTRIC CONTACT CONVERTERS WITH ELECTROMAGNETICALLY
CONTROLLED CONTACTS
Filed March 25, 1952　　　　　　　　　　3 Sheets-Sheet 1

United States Patent Office 2,777,982
Patented Jan. 15, 1957

2,777,982

ELECTRIC CONTACT CONVERTERS WITH ELECTROMAGNETICALLY CONTROLLED CONTACTS

Erich Rolf and Michael Belamin, Nurnberg, Germany, assignors to Siemens-Schuckertwerke Aktiengesellschaft, Berlin-Siemensstadt, Germany, a German corporation Application March 25, 1952, Serial No. 278,386

Claims priority, application Germany April 9, 1951

13 Claims. (Cl. 321—48)

Our invention relates to electric apparatus for converting an alternating current by means of contact devices operating in synchronism with the alternating current.

Such converters have been proposed in a design which provides for an electromagnetic control of the converter contacts. The contact devices are equipped with a magnet system whose movable armature operates, or serves as, the movable contact member. The magnet system has an energizing winding series connected with the contact member to be controlled so as to be traversed by the current flowing through the contact.

It has been proposed to connect a valve circuit across the contact gap so that this circuit passes a pickup current through the magnet winding at the beginning of each conducting period. As soon as the contact closes, the valve circuit, then shorted, is ineffective and the magnet winding is now traversed by the load current flowing through the closed contact and thus holds the contact in its closed position until, at the end of the natural current-conducting period, the current wave subsides below the critical holding value. The movable contact member under its opening bias then opens the circuit. Such converters automatically adapt the closing intervals of their contacts to the particular load conditions.

As a rule, electric contact converters, including those of the above-mentioned type, have their synchronous contact devices series connected with saturable switching reactors (commutating reactors) which temporarily flatten the current wave and produce a weak-current interval or "break step" at the end of each current-conducting interval of the pertaining converter contact thus minimizing the electric duty imposed on the opening contact. The same or a separate commutating reactor may be used for also producing a current step near the closing moment of the converter contact ("make step"), thus preventing a too rapid increase of the contact current immediately upon the first contact touch and permitting the current increase to commence only when the full contact engagement is secured. For reducing the possibility of wandering of contact material between the stationary and movable contact elements, these commutating reactors are usually equipped with premagnetizing circuits which shift the break and make steps toward the zero line of the contact current to only slight positive current values.

It is an object of our invention to devise contact converters with electromagnetically controlled contacts and series-connected saturable reactors, that afford improved operating conditions over the electromagnetic converters heretofore proposed, especially as regards voltage control possibilities and suppression of transfer of contact material, these and other objects being apparent from the following.

According to our invention, we provide a contact converter of the just-mentioned type with a control circuit which acts upon the contact-controlling electromagnet system in coaction with the main magnet winding and is energized by a periodic current to close the converter contact not later than the inception of the make step and to open the contact within the interval of the break step.

The invention proceeds from the fact that, in the presence of make and break steps, the closing and opening of a converter contact cannot be directly effected by the load current flowing through the contact. This is so because during the closing operation the magnet system of the contact must necessarily be traversed by a flux having at least the magnitude corresponding to the critical contact closing (pick-up) current. Otherwise, the contact could not be closed at all in this manner. However, the magnet winding can supply such a magnetic flux only after the make step has expired and the contact current has increased to a corresponding value. Therefore the above-mentioned valve-shunted converters, proposed for different operating conditions, are not readily applicable when the converter operation involves the occurrence of make steps practically coincident with the current zero line. During the break performance, a converter contact, if controlled only by the above-mentioned series-connected winding of the magnet system, would open only after the contact current has subsided below a value corresponding to the minimum holding flux. Consequently, the contact separation would occur already prior to the beginning of the break step, this being accompanied by an interruption of a finite residual contact current and hence by some transfer of contact material. According to the invention, therefore, the current in the circuit for the control of the contact closing and opening operations is so synchronized, by a suitable coupling with the converter main circuit, that it initiates the contact closing at an advanced cycle moment and maintains the contact closed at least up to the inception moment of the next break step.

The foregoing and other objects, advantages and features of our invention are referred to in the following description in conjunction with the drawings in which.

Figure 3:
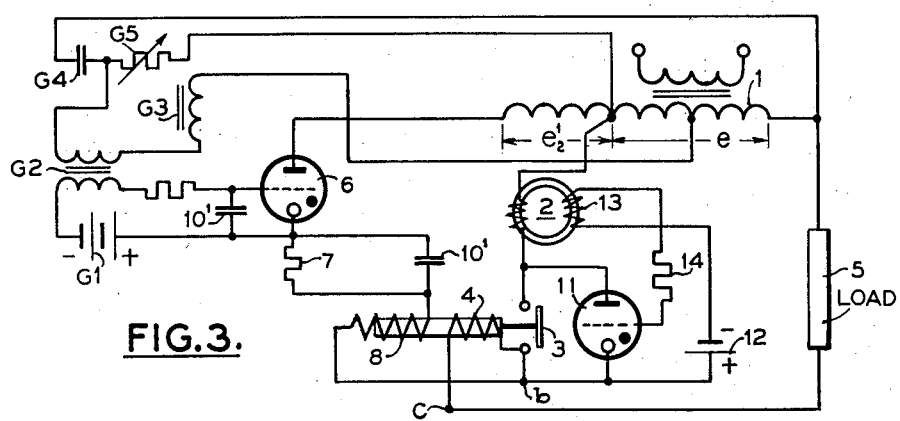
Figure 4:
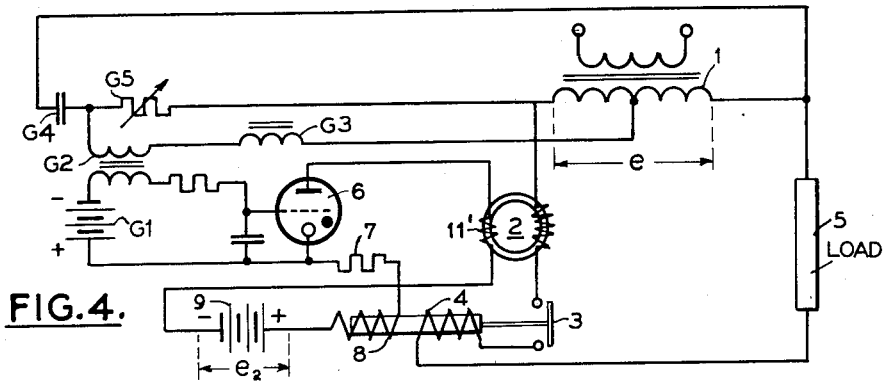
Figure 5:
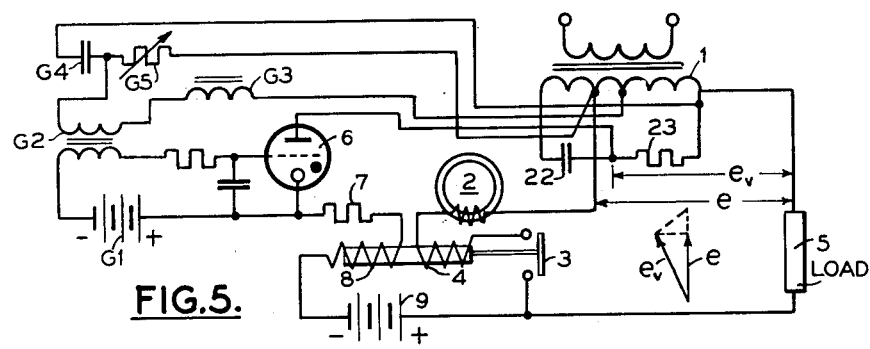
Figure 6:
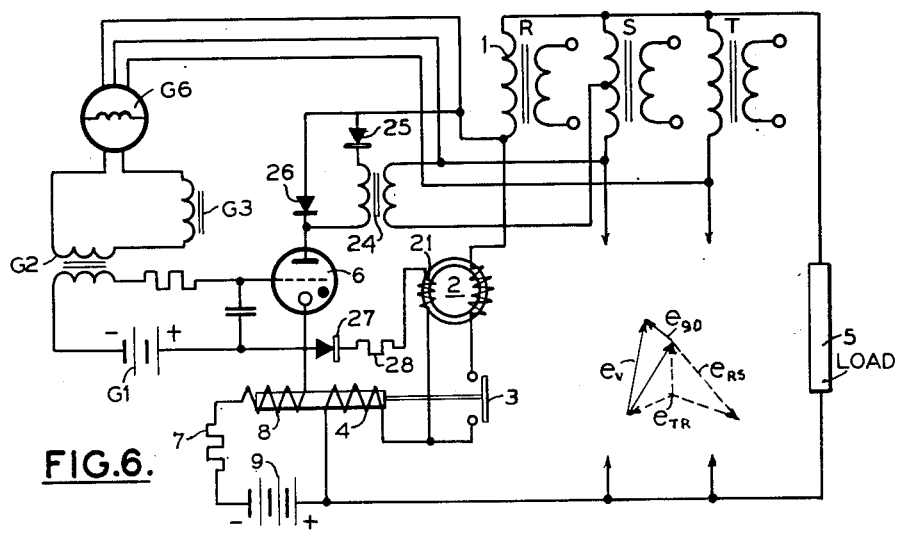
Figure 7:
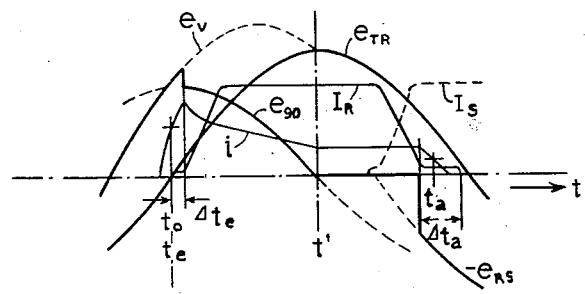
Figure 8:
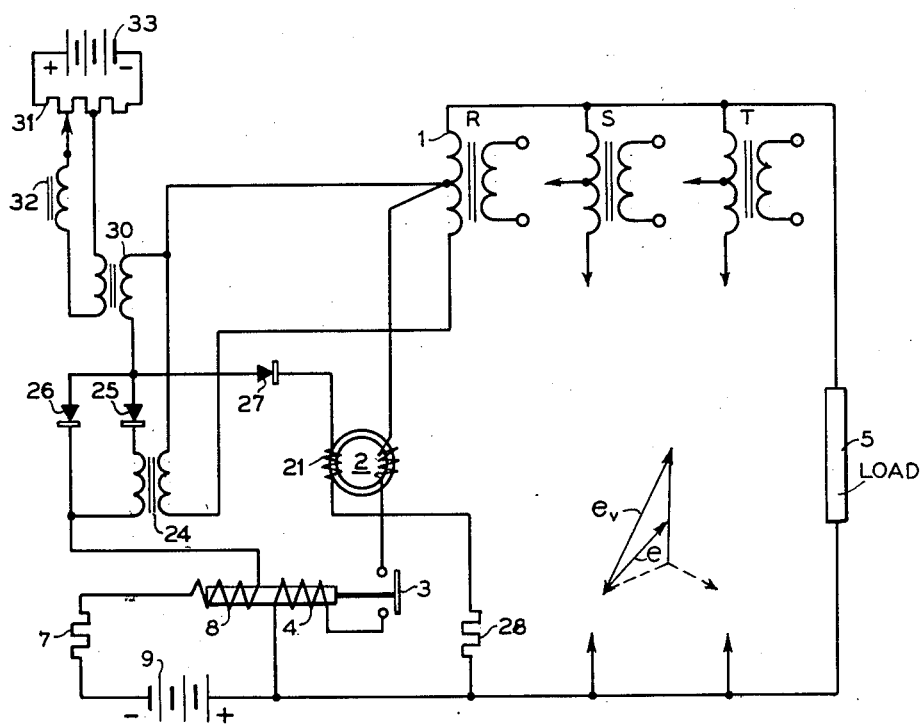

Figs. 3, 4, and 5 show three different modifications of a rectifier also in single-phase presentation;

Fig. 6 shows another embodiment of a rectifier according to the invention in a schematically illustrated three-phase connection;

Fig. 7 is an explanatory voltage and current diagram relating to rectifiers according to Figs. 5 and 6; and Fig. 8 is the schematic circuit diagram of another rectifier in three-phase connection.

It should be understood that the embodiments shown as single-phase half-wave converters are also applicable in multiphase connections in which they form one phase of the multiphase circuit, the other phases being designed and operative in a similar manner except that the make and break operations of the respective phases follow one another in a cyclical sequence. The illustrated circuits are further analogously suitable for full-wave rectifiers with bridge-type circuit schemes.

The same reference characters are applied to the various illustrations for denoting similar respective elements.

Figure 1:
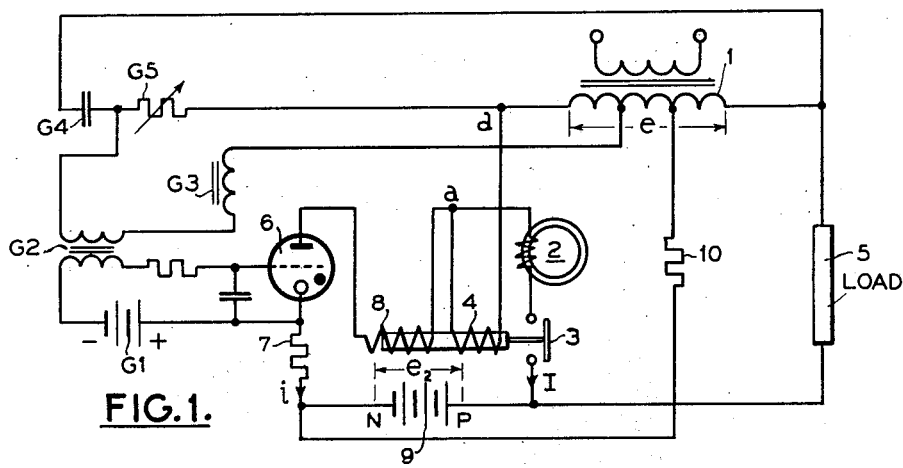
Fig. 1 shows the circuit diagram of a single-phase rectifier.

The converter circuit illustrated in Fig. 1 is energized from the secondary winding 1 of a power transformer to be energized from an alternating current line, for instance, of the customary line frequency of 50 C. P. S. or 60 C. P. S. The main circuit of the converter includes in series a commutating reactor 2 and a synchronous contact device 3 whose moveable contact element is biased to the illustrated open position, for instance, by a spring. The movable contact element is moved to, and held in, its closed position by a magnet system with a main coil 4 and an auxiliary control coil 8. The main coil 4 is series connected in the converter main circuit to be traversed by the contact current.

The commutating reactor may be inductively linked with auxiliary circuits, as previously proposed and known as such, for modifying the residual current value (step current) during the make step and during the break step or if desired, also for adjusting the length of the make step.

In a converter according to Fig. 1, the contact 3 in the main circuit cannot close without the aid of an auxiliary magnetic flux because the main coil 4 is not traversed by current as long as the contact 3 is open. For that reason, a control circuit is connected parallel to the main-circuit branch $a$—$b$ consisting of the series connection of the commutating reactor 2 and the contact 3. The control circuit includes a controllable valve 6, for instance, a grid controlled mercury vapor tube or a cesium vapor tube. Series connected with valve 6 in the control circuit is an ohmic resistor 7, the above-mentioned control coil 8 of the magnet system, and a suitable source of direct voltage 9. The magnitude of the direct voltage $e_z$ supplied from source 9 is preferably chosen only slightly larger than the ignition voltage of control valve 6. Practically the valve 6 can then conduct current, and hence contact 3 can close, only when the voltage effective between the circuit points $a$ and $b$, this voltage representing the make control voltage of the contact, has increased from the negative cutoff value up to a positive value. The grid control for tube 6, which may serve for controlling or regulating the rectified output voltage by the delayed-commutation method is effected with the aid of any one of the numerous known grid control circuits available for such purposes. In the illustrated example, the grid circuit comprises a source G1 of grid bias voltage and a transformer G2 whose primary is energized through a choke coil G3 from a tapped-off portion of the secondary 1 of the power transformer, a phase shift circuit with a capacitor G4 and an adjustable resistor G5 being interposed to permit adjusting the ignition moment of tube 6 to the proper phase position relative to the cycle period of the power-transformer voltage. The same grid circuit for tube 6 is shown in Figs. 3, 4 and 5.

Figure 2:
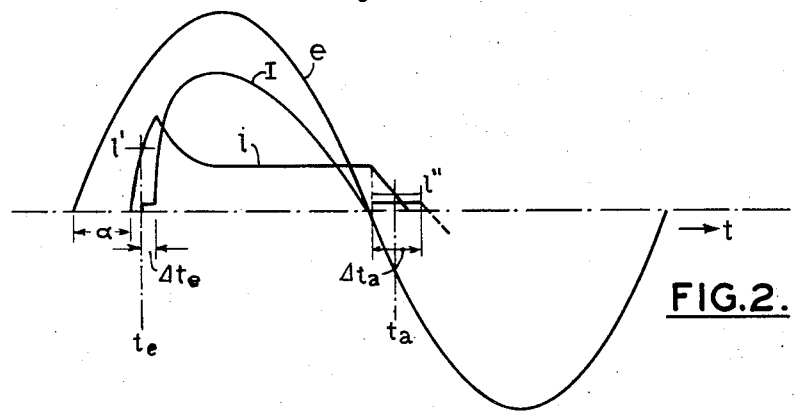
Fig. 2 is an explanatory coordinate diagram showing typical voltage and current curves relating to a rectifier according to Fig. 1.

The operation of the converter according to Fig. 1 is explained in the following with reference to the coordinate diagram of Fig. 2 in which the abscissa represents time. The curve $e$ denotes the sinusoidal secondary voltage of the transformer winding 1. The curve $i$ represents the current in the above-described parallel-connected control circuit, and the curve I indicates the contact current flowing through the converter contact 3 in the main circuit of the converter. Assume that the control tube 6 is ignited, after the expiration of a commutation delay or control angle $\alpha$, by applying a positive control pulse to the grid. Then the control circuit between points $a$ and $b$ carries at first an ascending current $i$ which energizes the control coil 8 of the magnet system. As soon as this current passes through the critical pick-up value $i'$, the contact 3 closes at the moment $te$. The contact current I, then initiated, has at first a very slight magnitude for the duration $\Delta te$ of the make step. Due to the effect of the voltage impressed across the commutating reactor 2 during the make step, the control current $i$ flowing through coil 8 rises to a further extent thus increasing the contact pressure. The make step is terminated when the commutating reactor 2 reaches saturation. From then on only the slight ohmic and inductive voltage drops in the winding of reactor 2 and the contact 3 are effective between the points $a$ and $b$. The control current $i$ therefore decays to a static value essentially determined by the ohmic resistance of the control circuit. This static value must be so adjusted that it lies still above the dropoff current magnitude $i$ of the contact. After termination of the make step, the contact current I extends in accordance with values determined by the voltage $e$ and the load resistance 5, and approaches the zero value at the end of its half wave. Now the break step interval $\Delta ta$ commences. The commutating reactor is now impressed by a voltage of reversed polarity (cutoff voltage) which brings the control current down to zero and extinguishes the valve 6. As soon as the current $i$ falls to a lesser value than the dropoff value $i$, the contact opens, as desired, within the break step interval $\Delta ta$ at the moment $ta$. Consequently, the maintenance of the control current up to the beginning of the break step has the effect of preventing any premature opening of contact 3 due to the declining magnetic flux caused by the contact current. A particular advantage of this circuit connection is the fact that in current converters for high power-current values the main magnet coil 4 can be given fewer turns, down to a single turn, thus minimizing the inductive direct-voltage drop and preventing an impairment of the power factor.

By virtue of a shunt-circuit control according to the invention, the converter circuit may be operated with any desired load-current magnitude from the thermally permissible maximum value down to the very slight minimum current required for securing the proper magnetization of the series-connected commutating reactor. If the exterior direct-current load circuit is to be operated with currents below this minimum value, then an auxiliary base load may be connected parallel to the exterior load circuit in the customary manner. However, if such a slight exterior load is not expected, the additional base load need not be used because it is readily permissible to completely deenergize the load by opening the exterior load circuit, or by interrupting the primary circuit of the power transformer for eliminating the alternating voltage, or by eliminating the ignition pulses for the control valve.

When, as shown in Fig. 1, a storage battery is used as a direct-voltage source 9 for the control circuit, then the battery may be charged from the pertaining converter during the normal converter operation. For this purpose the negative pole N of the battery need only be connected with the load-side terminal of the transformer winding 1 or, preferably and as shown, with a transformer tap point of lower voltage. The connection preferably includes a resistor 10 for adjusting the magnitude of the charging current. It is therefore possible to continuously keep the battery in its properly charged condition. The direct voltage $e_z$, however, may also be supplied by rectification, for instance, from the alternating-voltage supply of the converter, preferably with the aid of a barrier-layer rectifier and, if necessary, in conjunction with smoothing means.

In some cases of application, a battery 9 or other source of additional direct voltage need not be provided so that the above-described converter is modified to the circuit design shown in Fig. 3. In other cases of application it may be preferable to provide an additional alternating voltage $e'_z$ to aid in the ignition of the tube 6.

Such an alternating voltage may be supplied from an additional secondary winding on the power transformer and in phase with the winding 1 as indicated at 9' in Fig. 3. For shortening the duration of the increase in control current and for accelerating the extinction of the current flow in tube 6, the resistor 7 may be shunted by a capacitor 10' as also shown in Fig. 3. The converter contact 3 may be shunted by a current path which permits a finite small step current to continue flowing after the opening of the contact thus securing the continuance of the correct remagnetization of the commutating reactor during the rest of the break step interval. Fig. 3 shows, as an example, a shunt circuit which comprises a controllable valve 11. This valve may advantageously consist of a grid-controlled cesium vapor tube because of the slight arc-drop voltage of such tubes, amounting to only a few volts. The tube 11 has a grid circuit with a source 12 of negative bias voltage, a control winding 13 on the core of the commutating reactor 2, and a grid resistor 14. The control winding 13 has the polarity of connection needed for applying to the grid of tube 11 a positive potential relative to the tube cathode during the break-step interval so that the tube 11 can conduct any residual positive current when the contact opens.

In the circuit according to Fig. 3, the connection of the magnet control coil 8 is placed from point b to point c, whereby the control current traverses not only the control coil 8 but also the main control coil 4 and thus produces a further increase of the magnetic pulling forces during the contact-closing operation. A similar result is obtained in the circuit according to Fig. 1, the main magnet coil 4 being connected between points a and d of the converter main circuit and the control coil 8 being connected between point a and the anode of the control valve 6.

In the embodiment of Fig. 4 the control circuit for energizing the coil 8 of the magnet system for the converter contact is electrically isolated from the main circuit but inductively coupled therewith.

The cutoff pulse for terminating the conductance of control tube 6 is obtained by means of an auxiliary winding 11' on the core of the commutating reactor 2. During the break-step interval the then occurring remagnetization of the commutating reactor causes a voltage to be induced in winding 11'. This voltage is opposed to the direction of the control current and consequently depresses this current to zero after the inception of the break step. Instead of providing a direct-voltage source 9, the additional voltage for the control circuit may in certain cases also consist of an alternating voltage which may be taken, for instance, from an auxiliary winding of the transformer 1 (see the similar transformer winding 9' shown in Fig. 3).

The invention is not limited to mechanical contact converters in the narrower sense of this term, that is, it is not limited to continuous rectification, but it may also be used for a periodic interruption and reclosing of the rectified-current circuit by correspondingly controlling the gating voltage applied to the grid of control tube 6. Consequently, the above-described converter circuits are readily applicable for the production of trains of unidirectional current pulses as required, for instance, for welding or electroplating and other galvanic operations. If both half waves of an alternating current are rectified by a pair of devices according to the above-described embodiments, these devices being connected in mutually inverse polarity relation, then the resulting apparatus is applicable as a circuit breaker for alternating current.

It will be recognized that in the above-described embodiments of the invention the energization of the control circuit for the magnet control coil 8 is supplied or derived from the commutation voltage of the converter, the voltage of the additional battery or other direct current source in the control circuit being so chosen that, for the obtainable maximum of the converter output voltage, the control current commences at about the voltage zero passage of the alternating voltage. A zero-angle voltage control, namely the rectification of a complete half wave, is not quite attainable in this manner because the control current can reach the pick-up value of the magnet system only with some delay relative to the ignition of the control current. This, of course, places some limitation upon the maximum degree of voltage control available with such a converter. According to the invention, however, an improvement in this respect is achieved by impressing upon the control circuit a voltage which leads the commutation voltage of the converter. The embodiments described below with reference to Figs. 5 to 8 are in accordance with this feature. Added to each of Figs. 5, 6 and 8 is an explanatory vector diagram of characteristic voltages referred to in the following. The reference numerals used in these figures are in accordance with those applied to the above-described embodiments for respectively similar elements.

In the converter according to Fig. 5, the main converter circuit is energized from the secondary winding 1 of a power transformer and comprises a commutating reactor 2 in series with the pertaining converter contact 3 and with the main coil 4 of the magnet system for controlling the contact 3. In this single-phase illustration, the direct current load 5 is also series connected in the main circuit. The reactor 2 may be equipped with auxiliary circuits and the contact 3 may be shunted as described previously. The magnet system of contact 3 has a control coil 8 connected in a control circuit which also includes a valve 6, a resistor 7 and a suitable source of direct voltage 9, substantially in accordance with the embodiment described in conjunction with Fig. 1.

The energizing transformer winding 1 has additional turns which extend beyond one connection point of the converter main circuit. Connected across the entire transformer winding, including the overhanging-turns portion, is a voltage-divider circuit consisting of the series connection of a capacitor 22 with a resistor 23. The voltage $e_V$ across the resistor 23 is phase displaced by a leading angle with respect to the main voltage $e$ across the converter main circuit. As the leading voltage $e_V$ is effective in the control circuit, the control current for the winding 8, under otherwise the same conditions as described with reference to Fig. 1, commences at an earlier moment. However, since this leading voltage at the end of the current-flow period passes through zero before the break step commences, the control circuit might be prematurely cut off so that the opening of the converter contact would be controlled only by the contact current in coil 4. This would have the undesired result of having the opening of contact 3 occur prior to the beginning of the break step. This, however, can be prevented by selecting a higher voltage of battery 9 so that the cutoff in the control circuit becomes effective only at a negative value of the control voltage $e_V$. It can thus be made certain that the closing moment of the contact coincides with the moment in which the driving voltage $e$ of the main circuit traverses the zero value. In other words, this circuit permits achieving a full-voltage adjustment (zero delay angle) of the converting apparatus.

Another possibility according to the invention of securing such a full-voltage control is exemplified by the converter illustrated in Fig. 6. This converter is shown in three-phase connection although only the details of the phase R are illustrated, those of respective phases S and T being similar.

According to Fig. 6 an additional voltage source in the form of an auxiliary transformer 24 is inserted into the control circuit. This transformer, in the illustrated circuit connection, impresses upon the control circuit a voltage component $e_{90}$ which is leading by 90° el., so that the total voltage $e_V$ of the control circuit is also leading relative to the commutating voltage $e_{TR}$ of the main converter circuit. This modification, therefore, also permits obtaining an operation in which the converter contact 3 closes at the moment $t_0$ when the commutating voltage passes through the zero value thus securing a desired full-voltage of the contact rectifier. The time curves of the above-mentioned voltages $e_V$, $e_{90}$, $e_{TR}$ are represented in Fig. 7 and will be explained in a later place.

The grid circuit of tube 6 in Fig. 6 is similar to those shown in Fig. 1, except that the phase shift circuit G4, G5 of Fig. 1 is replaced by a phase-shift transformer G6.

The additional transformer 24 according to Fig. 6 has its secondary winding connected in one branch of an automatic valve-controlled switching circuit which forms part of the control circuit for coil 8. One branch of the switching circuit comprises the secondary of transformer 24 in series with a valve 25, while the other branch contains only a valve 26. The functioning of this automatic switching circuit and of the entire converter system will presently be described with reference to Fig. 7 which, in addition to the above-mentioned voltage curves, shows also the time curves of the control current $i$ and of the converter phase currents $I_R$ and $I_S$. It should be understood that the step currents are practically zero when the premagnetization of the respective commutating reactors is suitably chosen, although in Fig. 7 these step currents for lucid illustration are shown somewhat above the zero line.

The converter according to Fig. 6 operates as follows. Before the voltage $e_{TR}$ between phases T and R (Fig. 7), ascending from negative values, approaches the zero moment $t_0$, the leading auxiliary voltage $e_V$ passes through its zero value and thereafter increases sinusoidally to positive instantaneous values. The auxiliary voltage $e_V$ is composed as follows. The voltage $e_{TR}$, obtaining between the transformer terminals of the phases T and R, is also effective between the transformer terminal point and the direct-current terminal point of phase R as long as the converter contact of the antecedent and still current-conducting phase T is closed and the pertaining commutating reactor saturated by the load current $I_T$. Also connected across the just-mentioned two terminal points and hence subject to the same voltage $e_{TR}$ is the control circuit with the discharge tube 6 for the phase R. This control circuit is additionally impressed by the voltage $e_{90}$ from the auxiliary transformer 24. At the time here considered the voltage $e_{90}$ acts in the forward direction of valve 25 and in the reverse direction of valve 26. Consequently, a countervoltage of the same magnitude $e_{90}$ occurs across valve 26. Hence, prior to the contact closing moment, the voltage $e_V$, obtaining between the anode of tube 6 and the direct-current terminal point of phase R, is equal to the sum of the voltages $e_{TR}$ and $e_{90}$. The sum voltage $e_V$, augmented by the voltage of battery 9 (the latter voltage being omitted in Fig. 7) is impressed across the electrodes of tube 6.

The transformer G2 impresses upon the grid circuit of tube 6 an auxiliary grid voltage whose phase position is adjustable by means of the phase shifter G6. As soon as this auxiliary grid voltage becomes larger than the negative grid bias voltage from battery G1, the tube 6 is ignited. This may occur, for instance, at the moment $t_V$, prior to the moment $t_0$ at which the voltage $e_{TR}$ passes through zero. At the ignition moment $t_V$, a control current $i$ commences to flow through the contact-closing control coil 8 of the contact device. At first, current $i$ increases steeply. As soon as current $i$ reaches the critical pick-up value $i'$ of the contact device, coil 8 closes contact 3 of the phase R here under consideration.

The phase shifter 6 may be adjusted, for instance, so that the contact 3 will close just at the moment $t_0$ in which the voltage $e_{TR}$ passes through zero, this being shown in Fig. 7. At this moment, the make step $\Delta t_e$ commences as described above with reference to Fig. 2. During the make step, the commutating reactor of phase R is still unsaturated. The main current can at first be kept practically at the zero value so that no current-carrying duty is imposed upon the contact 3 at the closing moment. This can be attained by a suitable premagnetization of the commutating reactor, for instance, with the aid of the winding 21 in conjunction with a premagnetizing circuit which commences to conduct current when tube 6 is ignited as will be described in a later place.

The change in the magnetic condition of the commutating reactor 2 during the make-step period $\Delta t_e$ has the consequence that virtually the full voltage $e_{TR}$ is absorbed by the voltage drop across the reactor main winding. Consequently, during this period of time, the sum of the battery voltage and voltage $e_V$ is also effective in the control circuit. At that time the instantaneous values of voltage $e_V$ are still on the increase. At first, the control current $i$ also increases to higher instantaneous values until the make step $\Delta t_e$ is terminated and the commutating reactor saturated. Then the voltage $e_{TR}$ suddenly disappears from the commutating reactor and distributes itself upon all active and reactive impedances of the commutation circuit now formed by the phases T and R whose contact devices are now both closed. During the commutation interval, the current $I_T$ in the antecedent phase T decays while the current $I_R$ in phase R increases. Aside from its ohmic resistance, the saturated commutating reactor of phase R now participates in the above-mentioned impedances of the commutating circuit only with a relatively slight air inductivity. For that reason, the impedance of the reactor and also of the resistance of coil 4 may be neglected in first approximation. This is proper especially in view of the fact that the coil 4 now exerts an additional holding force upon the contact 3 so that a switching operation cannot occur in phase R here being considered.

For further explanation it may, therefore, be assumed that after the termination of the make step $\Delta t_e$ no potential difference exists between the transformer terminal point and the direct current terminal point of phase R. Neglecting the constant voltage supplied from battery 9, the control circuit of the contact device in phase R, previously impressed only by the resultant voltage $e_V$, is now predominantly controlled by the additional voltage $e_{90}$. Voltage $e_{90}$ continues to change its instantaneous values according to a sine wave and assumes decreasing instantaneous values. As long as the voltage $e_{90}$ remains positive, the control current $i$ flows through branch 24, 25 of the electric shunting circuit, the premagnetizing current of winding 21 driven by the same voltage $e_{90}$ being negligible in this respect. Commencing at the moment $t'$ at which the additional voltage $e_{90}$ passes through zero, this voltage acts on valve 25 in the reverse direction, so that a blocking voltage occurs at valve 25 balancing the additional voltage $e_{90}$. Consequently, as soon as the additional voltage $e_{90}$ assumes negative polarity, it loses its controlling influence upon the control circuit. Hence, from moment $t'$ on, the control circuit is only controlled by the voltage of battery 9. The control current $i$, now driven only by the battery voltage, passes through valve 26 in the other branch of the electric shunting circuit and remains temporarily constant at a magnitude sufficient to keep contact 3 closed even when the current $I_R$ drops nearly to zero during the subsequent commutation interval occurring when the next sequential phase S becomes conductive.

Only when the break step $\Delta t_a$ commences is phase R prepared for opening of its contact. That is, as soon as the commutating reactor of phase R now again enters into the unsaturated condition, it suddenly absorbs the full voltage $e_{SR} = -e_{RS}$, this full voltage being effective in the commutating circuit now formed by the phases R and S. Consequently, the voltage $-e_{RS}$ now obtains between the transformer terminal point and the direct-current terminal point of phase R, these being the same points across which the control circuit of phase R is connected. Since the voltage $-e_{Rs}$ is opposed to the voltage of battery 9, the control current $i$ now rapidly declines to zero and the tube 6 ceases to conduct. Shortly prior to this moment, that is when the declining control current subsides below the holding-current value of the magnet coil 8 at moment $t_a$, the contact 3 of phase R is opened. In this case, therefore, the correct phase position of the opening moment $t_a$ for zero-angle control, namely within the step $\Delta t_a$, is secured even without an increased voltage of battery 9. The leading voltage $e_v$ reappears in the control circuit for phase R only when the converter phase T is conducting its full load current.

The converter of Fig. 6 is also equipped with an auxiliary circuit branch for premagnetizing the commutating reactor 2 in the make sense by means of an auxiliary winding 21 on the reactor core. The auxiliary circuit branch also includes a valve 27 and a series resistor 28. This circuit branch may be connected to the control circuit for coil 8 at a point ahead of the switching circuit 24, 25, 26 or, as illustrated, it may be connected to a point behind the latter circuit, depending upon whether the voltage-responsive make premagnetization is to commence at about the closing moment $t_e$ or at an earlier time point.

It may be mentioned at this point that, while in the foregoing the valves 6 in the control circuit of the magnet system for the synchronous converter contact are described as electonic discharge devices, the invention may instead be carried out with the aid of other electric valve-type devices. For instance, and as exemplified by the embodiment of Fig. 8, saturable-reactor devices of the kind known as transductors or magnetic amplifiers are suitable for this purpose. The embodiment according to Fig. 8 also differs from that of Fig. 6 by a different sequence of the various series-connected elements of the control circuit and also by a different manner of providing the leading additional voltage.

The magnetic amplifier or transductor which in Fig. 8 takes the place of the valve 6 previously described, comprises a saturable and separately premagnetizable reactor in series connection with a two-electrode valve, for instance, of the barrier layer type. Since the control circuit for coil 8 of the converter magnet system has already a valve connection, this being due to the presence of the above-mentioned switching circuit 24, 25, 26, a transductor control may be obtained merely by adding the reactor portion of a transductor circuit. According to Fig. 8, this reactor portion comprises a saturable reactor 30 with an accessory circuit means containing a battery 33 or other source of constant voltage, a voltage divider 31 and a stabilizing reactor 32 for selectively pre-exciting the saturable reactor 30 by direct current of variable magnitude and reversible polarity. It is assumed that the core of the saturable reactor 30 consists of a magnetizable material of slight remanence whose characteristic has a noticeable inclination toward the flux axis in the unsaturated region.

The converter according to Fig. 8 is also equipped with the auxiliary circuit branch 21, 27, 28 described above with reference to Fig. 6.

The operation of the converter of Fig. 8, as a whole, is similar in principle to that of Fig. 6. It will be understood that by changing the adjustment of the voltage divider 31 in Fig. 8, the delivered voltage of the converter can be controlled and regulated in basically the same manner as by means of the grid control available in the previously-described embodiments for the tube 6.

It will be apparent to those skilled in the art upon a study of this disclosure that converters according to our invention may be modified in various respects and may be embodied in designs, and used for particular applications, other than those specifically set forth in the foregoing, without departing from the essence of our invention and within the scope of the claims annexed hereto.

We claim:

1. An electric contact converter having alternating current supply means, synchronous contact means connected to said supply means, and a saturable reactor series-connected with said contact means for flattening the current wave during step intervals near the current zero passages, in combination, electromagnet means for controlling said contact means, said electromagnet means having a main coil for holding said contact means in closed condition and having a control coil for initiating the closing of said contact means, said main coil being series-connected with said contact means to be traversed by contact current, and a control circuit including said control coil and connected parallel to the series connection of said reactor and said contact means for passing periodic control current through said control coil.

2. In a converter according to claim 1, said control circuit comprising an adjusting resistor for controlling the magnitude of said control current, and a capacitor connected across said adjusting resistor.

3. An electric contact converter, comprising a converter circuit having alternating-voltage supply means and having a saturable switching reactor and a synchronous electromagnetic contact device series-connected with each other, said contact device having a main magnet coil series-connected in said converter circuit and having a circuit-closing control coil, and a control circuit including said control coil and being connected with said converter circuit in parallel relation to the series connection of said reactor with the contact gap of said contact device but in series relation to said main magnet coil to pass periodic control current serially through said two coils, said two coils being poled in the cumulative sense relative to said control current.

4. An electric contact converter for passing unidirectional current to a load, comprising a converter circuit having alternating voltage supply means and having a saturable commutating reactor and a synchronous electric contact device series connected with each other and with the load, said contact device having a circuit-closing control coil, a control circuit including said coil and connected parallel to the series connection of said reactor and contact device, said circuit being operative to energize said coil and thereby actuate said contact device independently of current flowing through said device.

5. An electric contact converter, comprising a converter circuit having alternating-voltage supply means and having an electromagnetic contact device and a saturable reactor series-connected with said device for producing make-step intervals and break-step intervals of depressed current magnitude which intervals include the closing and opening moments respectively of said device, said device having a main magnet coil series-connected in said converter circuit and having a circuit-closing control coil, a magnet control circuit including said control coil and coupled with said converter circuit to be traversed by periodic control current, valve circuit means connected in said magnet control circuit, valve control means operative to cause said valve circuit means to start conducting when the contact voltage of said device has a given polarity and to stop conducting during said break-step interval, inductive coupling means interconnecting said valve control means and said saturable reactor and operative to stop conductance in said valve circuit means by a counter voltage dependent upon the voltage across said reactor.

6. An electric contact converter, comprising a converter circuit having alternating-voltage supply means and having an electromagnetic contact device and a saturable reactor series-connected with said device for producing make-step intervals and break-step intervals of depressed current magnitude which intervals include the closing and opening moments respectively of said device, said device having a main magnet coil series-connected in said converter circuit and having a circuit-closing control coil, a magnet control circuit including said control coil and coupled with said converter circuit to be traversed by periodic control current, valve circuit means connected in said magnet control circuit, a valve control circuit operative to cause said valve circuit means to start conducting when the contact voltage of said device has a given polarity and to stop conducting during said break-step interval, said valve control circuit being connected parallel to the series connection of said reactor and the contact gap of said contact device, and auxiliary-voltage supply means connected in said valve control circuit for determining the voltage magnitude of said control current at which said valve means starts conducting.

7. An electric contact converter, comprising a converter circuit having alternating-voltage supply means and having an electromagnetic contact device and a saturable reactor series-connected with said device for producing make-step intervals and break-step intervals of depressed current magnitude which intervals include the closing and opening moments respectively of said device, said device having a main magnet coil series-connected in said converter circuit and having a circuit-closing control coil, a magnet control circuit including said control coil and coupled with said converter circuit to be traversed by periodic control current, valve circuit means connected in said magnet control circuit, a valve control circuit operative to cause said valve circuit means to start conducting when the contact voltage of said device has a given polarity and to stop conducting during said break-step interval, said valve control circuit being connected parallel to the series connection of said reactor and the contact gap of said contact device, and a source of direct voltage connected in said valve control circuit in series relation to said valve means and having a voltage at least about equal to the ignition voltage of said valve means.

8. An electric contact converter, comprising a converter circuit having alternating-voltage supply means and having an electromagnetic contact device and a saturable reactor series-connected with said device for producing make-step intervals and break-step intervals of depressed current magnitude which intervals include the closing and opening moments respectively of said device, said device having a main magnet coil series-connected in said converter circuit and having a circuit-closing control coil, a magnet control circuit including said control coil and coupled with said converter circuit to be traversed by periodic control current, valve circuit means connected in said magnet control circuit, a valve control circuit operative to cause said valve circuit means to start conducting when the contact voltage of said device has a given polarity and to stop conducting during said break-step interval, said valve control circuit being connected parallel to the series connection of said reactor and the contact gap of said contact device, and additional alternating-voltage supply means connected with said valve control circuit in series relation to said valve means.

9. A commutating contact converter, comprising alternating-voltage supply means and a supply circuit connected to said supply means, said supply circuit having a commutating reactor and an electromagnetically controllable contact device series connected with each other, said device having a magnet control coil acting in the contact closing sense, phase-shift means connected with said supply means to provide a control voltage of a leading phase angle relative to the commutating voltage, and a control circuit comprising valve means and connecting said phase-shift means with said control coil for exciting said control coil during the closing periods of said device, said phase-shift means comprising a complex voltage divider and having a tap point, said control circuit extending from said tap point to a point of said supply circuit separated from said voltage supply means by said reactor and the contact gap of said contact device.

10. An electric contact converter for passing unidirectional current to a load, comprising a converter circuit having alternating-voltage supply means and having a saturable commutating reactor and a synchronous electric contact device series connected with each other and with the load, said contact device having a circuit-closing control coil, a control circuit including said coil, said circuit being operative to energize said coil and thereby actuate said contact device independently of current flowing through said device, voltage means connected in said control circuit operative to vary the current in said control circuit in synchronism with the voltage of said supply means, an additional source of auxiliary alternating voltage of a leading phase angle relative to the commutating voltage at said contact device, and a switching circuit having two parallel branches series-connected in said control circuit and having respective auxiliary valves of the same poling sense in said two branches, said auxiliary source being connected with only one of said two branches to impress thereon said auxiliary voltage.

11. An electric contact converter for passing unidirectional current to a load, comprising a converter circuit having alternating-voltage supply means and having a saturable commutating reactor and a synchronous electric contact device series connected with each other and with the load, said contact device having a circuit-closing control coil, a control circuit including said coil, said circuit being operative to energize said coil and thereby actuate said contact device independently of current flowing through said device, voltage means connected in said control circuit operative to vary the current in said control circuit in synchronism with the voltage of said supply means, an additional source of auxiliary alternating voltage of a leading phase angle relative to the commutating voltage at said contact device, a switching circuit having two parallel branches series-connected in said control circuit and having respective auxiliary valves of the same poling sense in said two branches, said auxiliary source being connected with one of said branches, and an asymmetrically conductive premagnetizing circuit attached to one end of said switching circuit and extending to a load-size circuit point of the series connection of said reactor and contact device for premagnetizing said reactor in the make-step sense.

12. An electric contact converter for passing unidirectional current to a load, comprising a converter circuit having alternating-voltage supply means and having a saturable commutating reactor and a synchronous electric contact device series connected with each other and with the load, said contact device having a circuit-closing control coil, a control circuit including said coil, said circuit being operative to energize said coil and thereby actuate said contact device independently of current flowing through said device, voltage means connected in said control circuit operative to vary the current in said control circuit in synchronism with the voltage of said supply means, circuit means for providing a voltage of a leading phase angle relative to the commutating voltage at said contact device, said circuit means being connected with said control circuit to superimpose thereon said leading voltage, and remagnetizing circuit means for back-magnetization of said commutating reactor after each break-step interval and prior to the contact closing moment, said remagnetizing circuit having an auxiliary winding inductively linked with said commutating reactor.

13. An electric contact converter having alternating current supply means, synchronous contact means connected to said supply means, and a saturable reactor series-connected with said contact means for flattening the current wave during step intervals near the current zero passages, in combination, electro-magnet means for controlling said contact means, said electromagnet means having a main coil for holding said contact means in closed condition and having a control coil for initiating the closing of said contact means, said main coil being series-connected with said contact means, a control circuit connected with said control coil and coupled with said supply means to pass periodic control current through said control coil, controllable valve means in said circuit operative to regulate the starting moment of said control current for controlling the converter output voltage, circuit means for providing a voltage of a leading phase angle relative to the commutating voltage at said contact device, said circuit means being connected with said control circuit to superimpose thereon said leading voltage, and remagnetizing circuit means for back-magnetization of said commutating reactor after each break-step interval and prior to the contact closing moment, said remagnetizing circuit having an auxiliary winding inductively linked with said commutating reactor.

References Cited in the file of this patent

UNITED STATES PATENTS

| | | | |
|---|---|---|---|
| 2,284,794 | Bedford | June 2, | 1942 |
| 2,502,932 | Diebold | Apr. 4, | 1950 |
| 2,610,231 | Wettstein | Sept. 9, | 1952 |
| 2,619,628 | Kesselring | Nov. 25, | 1952 |

FOREIGN PATENTS

| | | | |
|---|---|---|---|
| 113,439 | Sweden | Mar. 13, | 1945 |
| 905,953 | France | Dec. 19, | 1945 |
| 869,983 | Germany | Mar. 9, | 1953 |